(12) United States Patent
Kim et al.

(10) Patent No.: US 8,199,815 B2
(45) Date of Patent: Jun. 12, 2012

(54) APPARATUS AND METHOD FOR VIDEO ENCODING/DECODING AND RECORDING MEDIUM HAVING RECORDED THEREON PROGRAM FOR EXECUTING THE METHOD

(75) Inventors: So-young Kim, Yongin-si (KR); Jeong-hoon Park, Seoul (KR); Sang-rae Lee, Suwon-si (KR); Yu-mi Sohn, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1570 days.

(21) Appl. No.: 11/482,745

(22) Filed: Jul. 10, 2006

(65) Prior Publication Data

US 2007/0047656 A1    Mar. 1, 2007

(30) Foreign Application Priority Data

Aug. 27, 2005  (KR) ........................ 10-2005-0079128

(51) Int. Cl.
H04B 1/66 (2006.01)
(52) U.S. Cl. ......... 375/240.11; 375/240.25; 375/240.26; 375/240.13; 375/240.12; 382/233; 382/235; 382/238; 382/243
(58) Field of Classification Search ............. 375/240.11, 375/240.25, 240.26, 240.13, 240.12; 382/233, 382/235, 238, 243
See application file for complete search history.

(56) References Cited

U.S. PATENT DOCUMENTS

| 5,600,375 A | 2/1997 | Wickstrom |
| 5,633,684 A | 5/1997 | Teranishi et al. |
| 7,010,044 B2 * | 3/2006 | Dattani et al. ........... 375/240.24 |
| 2004/0062445 A1 * | 4/2004 | Kim et al. ..................... 382/238 |
| 2004/0228410 A1 | 11/2004 | Ameres et al. |

FOREIGN PATENT DOCUMENTS

| JP | 06-217291 A | 8/1994 |
| JP | 06-311505 A | 11/1994 |
| JP | 08-237489 A | 9/1996 |
| KR | 10-2003-0094086 A | 12/2003 |
| KR | 10-2004-0031949 A | 4/2004 |
| KR | 10-2004-0093253 A | 11/2004 |
| KR | 10-2005-0012853 A | 2/2005 |
| WO | 2006004331 A1 | 1/2006 |

OTHER PUBLICATIONS

Han, Woo-Jin et al.; "Responses of CE1c: intra prediction," ISO/IEC JTC1/SC29/WG11 MPEG2004/M11054, Jul. 2004, pp. 1-18, Redmond, USA.

Yang, Chun-Ling et al.; "A fast H.264 intra prediction algorithm using macroblock properties," Image Processing, 2004. ICIP 04. 2004 International Conference on Singapore Oct. 24-27, 2004, Piscataway, NJ, USA, IEEE, vol. 1, Oct. 24, 2004, pp. 461-464.

(Continued)

*Primary Examiner* — Shawn An
(74) *Attorney, Agent, or Firm* — Sughrue Mion, PLLC

(57) ABSTRACT

An intraprediction encoding and decoding apparatus and method to improve compression efficiency are provided. A video encoding method includes dividing an input video of a predetermined size into at least two sub-planes, performing intraprediction encoding on at least one of the divided at least two sub-planes, and performing interprediction encoding on at least one of the remaining sub-planes by using the intraprediction encoded sub-plane as a reference sub-plane.

18 Claims, 16 Drawing Sheets

OTHER PUBLICATIONS

Pan, F. et al.; "Fast mode decision for intra prediction," Joint Video Team (JVT) of ISO/IEC MPEG & ITU-T VCEG (ISO/IEC JTC1/SC29/WG11 and ITU-T SG16 Q6), Mar. 7, 2003, pp. 1-22.

Pan, F. et al.; "Fast mode decision algorithm for intraprediction in H.264/AVC video coding," IEEE Transactions on Circuits and Systems for Video Technology, IEEE Service Center, Piscataway, NJ, US, vol. 15, No. 7, Jul. 2005, pp. 813-822.

* cited by examiner

16X16 MACROBLOCK    SUB-PLANE 1    SUB-PLANE 2

16X16 MACROBLOCK    SUB-PLANE 1    SUB-PLANE 2

APPARATUS AND METHOD FOR VIDEO ENCODING/DECODING AND RECORDING MEDIUM HAVING RECORDED THEREON PROGRAM FOR EXECUTING THE METHOD

CROSS-REFERENCE TO RELATED PATENT APPLICATION

This application claims priority from Korean Patent Application No. 10-2005-0079128, filed on Aug. 27, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to video compression encoding, and more particularly, to video prediction methods which improve compression efficiency, and apparatuses and methods for video encoding/decoding using the video prediction method.

2. Description of the Related Art

In well-known video compression standards such as moving picture expert group (MPEG)-1, MPEG-2, MPEG-4 Visual, H.261, H.263, and H.264, a picture is generally divided into macroblocks for video encoding. In the case of H.264 encoders, after each of the macroblocks is encoded in all encoding modes available in interprediction and intraprediction, bit rates required for encoding a macroblock and rate-distortion (RD) costs between the original macroblock and the decoded macroblock in the encoding modes are compared. Then, an appropriate encoding mode is selected according to the comparison result and the macroblock is encoded in the selected encoding mode.

In intraprediction, instead of referring to reference pictures in order to encode macroblocks of a current picture, a prediction value of a macroblock to be encoded is calculated using a pixel value of a pixel that is spatially adjacent to the macroblock to be encoded, and a difference between the prediction value and the pixel value is encoded.

FIG. 1 illustrates previous macroblocks used for intraprediction of a current macroblock $a_5$ according to the prior art.

Referring to FIG. 1, previous macroblocks $a_1$, $a_2$, $a_3$, and $a_4$ are used for intraprediction of a current macroblock $a_5$. According to a raster scan scheme, macroblocks included in a picture are scanned from left to right and from top to bottom. Thus, the previous macroblocks $a_1$, $a_2$, $a_3$, and $a_4$ are scanned and encoded before the current macroblock $a_5$.

Because macroblocks marked with X have not been encoded, they cannot be used for predictive encoding of the current macroblock $a_5$. Because macroblocks marked with O have low correlation with the current macroblock $a_5$, they are not used for predictive encoding of the current macroblock $a_5$. The previous macroblocks $a_1$, $a_2$, $a_3$, and $a_4$, which have been discrete cosine transformed and quantized, are inversely quantized and inversely discrete cosine transformed to be reconstructed.

FIG. 2 is a reference diagram for explaining adjacent pixels used in intra 4×4 modes of H.264 according to prior art.

Referring to FIG. 2, lower case letters a through p indicate pixels of a 4×4 block to be predicted, and upper case letters A through M located above and on the left side of the 4×4 block indicate neighboring samples or pixels required for intraprediction of the 4×4 block, which have been already encoded and reconstructed.

FIG. 3 illustrates intra 4×4 modes used in H.264 according to prior art.

Referring to FIG. 3, the intra 4×4 modes include a total of 9 prediction modes, i.e., a direct current (DC) mode, a vertical mode, a horizontal mode, a diagonal down-left mode, a diagonal down-right mode, a vertical left mode, a vertical right mode, a horizontal up mode, and a horizontal down mode. In the intra 4×4 modes, pixel values of pixels a through p are predicted from pixels A through M of adjacent macroblocks. The compression efficiency of encoders varies with an encoding mode selected for intraprediction. To select the optimal encoding mode, prediction of a block is performed in all possible encoding modes, costs are calculated using a predetermined cost function for the encoding modes, and an encoding mode having the smallest cost is selected for encoding.

However, there still is a need for an encoding method capable of improving compression efficiency to provide high-quality video to users.

SUMMARY OF THE INVENTION

The present invention provides an encoding and decoding apparatus and method to improve compression efficiency in intraprediction.

According to one aspect of the present invention, there is provided a video encoding method. The video encoding method includes dividing an input video of a predetermined size into at least two sub-planes, performing intraprediction encoding on at least one of the at least two sub-planes, and performing interprediction encoding on at least one of the remaining sub-planes by using the intraprediction encoded sub-plane as a reference sub-plane.

The dividing of the input video of the predetermined size into the sub-planes may include sub-sampling the input video.

The performing of intraprediction encoding on at least one of the divided sub-planes may include performing the intraprediction encoding on all the divided sub-planes, comparing costs of the intraprediction encoded sub-planes, and selecting one of the sub-planes for intraprediction encoding based on the result of the comparison.

The dividing of the input video of the predetermined size into the sub-planes may include dividing an input video into a plurality of sub-planes according to a sub-plane type determined based on the spatial characteristic of the input video.

The input video of the predetermined size may be a macroblock.

The video encoding method may further include performing entropy encoding on the intraprediction encoded sub-plane and the interprediction encoded sub-planes, wherein the performing of entropy encoding uses a scan order varying with a method of dividing the input video into sub-planes.

The intraprediction encoded sub-plane used as the reference sub-plane may be a sub-plane that has been intraprediction decoded after having been intraprediction encoded, and a sub-plane which is to be intraprediction encoded.

The video encoding method may further include performing transformation and quantization on the intraprediction encoded sub-plane and the interprediction encoded sub-planes, wherein the performing of entropy encoding comprises inserting prediction mode information including at least one of the size of each of the divided sub-planes or the number of divided sub-planes, information specifying the intraprediction encoded sub-plane, and information about an interprediction encoding method.

According to another aspect of the present invention, there is provided a video encoder including a video division unit, a sub-plane intraprediction encoding unit, and a sub-plane interprediction encoding unit. The video division unit divides an input video of a predetermined size into at least two sub-planes. The sub-plane intraprediction encoding unit performs intraprediction encoding on at least one of the divided sub-planes. The sub-plane interprediction encoding unit performs interprediction encoding on at least one of the remaining sub-planes by using the intraprediction encoded sub-plane as a reference sub-plane.

According to still another aspect of the present invention, there is provided a video decoding method. The video decoding method includes receiving an encoded bitstream including video data obtained by performing intraprediction encoding on at least one sub-plane divided from an input video of a predetermined size and performing interprediction encoding on at least one of the other sub-planes based on the intraprediction encoded sub-plane, extracting video data from the received bitstream, performing intrapredicting decoding on at least one of sub-planes included in the extracted video data, and performing interprediction decoding on the other sub-planes by referring to the intraprediction decoded sub-plane.

The video decoding method may further include reconstructing the intraprediction decoded sub-plane and the interprediction decoded sub-planes to reconstruct the input video.

The video decoding method may further include extracting mode information, wherein the intraprediction decoding and the interprediction decoding are performed based on the extracted mode information.

The video decoding method may further include constructing the at least two sub-planes from the extracted video data.

The intraprediction encoded sub-plane used as the reference sub-plane may be a sub-plane that has been intraprediction decoded after having been intraprediction encoded, and a sub-plane which is to be intraprediction encoded.

According to yet another aspect of the present invention, there is provided a video decoder including an entropy decoding unit, a sub-plane intraprediction decoding unit, and a sub-plane interprediction decoding unit. The entropy decoding unit receives an encoded bitstream including video data obtained by performing intraprediction encoding on at least one sub-plane divided from an input video of a predetermined size and performing interprediction encoding on at least one of the other sub-planes based the intraprediction encoded sub-plane, and extracts video data from the received bitstream. The sub-plane intraprediction decoding unit performs intrapredicting decoding on at least one of sub-planes included in the extracted video data. The sub-plane interprediction decoding unit performs interprediction decoding on the other sub-planes by referring to the intraprediction decoded sub-plane.

According to yet another aspect of the present invention, there is provided a computer-readable recording medium having recorded thereon a program for executing a video encoding method. The video encoding method includes dividing an input video of a predetermined size into at least one sub-plane, performing intraprediction encoding on at least one of the divided sub-planes, and performing interprediction encoding on at least one of the remaining sub-planes by using the intraprediction encoded sub-plane as a reference sub-plane.

According to yet another aspect of the present invention, there is provided a computer-readable recording medium having recorded thereon a program for executing a video decoding method. The video decoding method includes receiving an encoded bitstream including video data obtained by performing intraprediction encoding on at least one sub-plane divided from an input video of a predetermined size and performing interprediction encoding on at least one of other sub-planes based the intraprediction encoded sub-plane, extracting video data from the received bitstream, performing intrapredicting decoding on at least one of sub-planes included in the extracted video data, and performing interprediction decoding on other sub-planes by referring to the intraprediction decoded sub-plane.

BRIEF DESCRIPTION OF THE DRAWINGS

The above and other features and advantages of the present invention will become more apparent by describing in detail exemplary embodiments thereof with reference to the attached drawings in which:

FIG. 1 illustrates previous macroblocks used for the intraprediction of a current macroblock according to the prior art;

FIG. 2 is a reference diagram for explaining adjacent pixels used in intra 4×4 modes of H.264 according to the prior art;

DETAILED DESCRIPTION OF THE EXEMPLARY EMBODIMENTS

Figure 4:
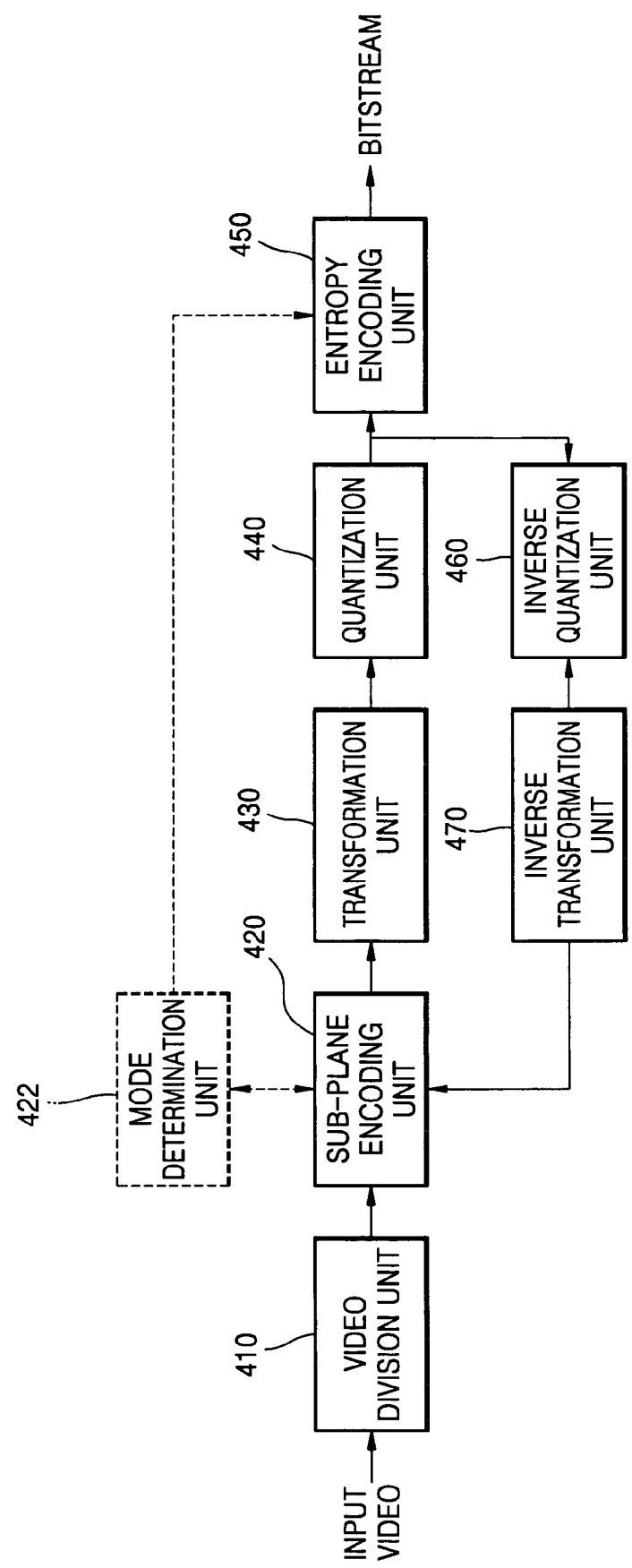
FIG. 4 is a block diagram of a sub-plane prediction encoder according to an embodiment of the present invention.

FIG. 4 is a block diagram of a sub-plane prediction encoder according to an exemplary embodiment the present invention.

Referring to FIG. 4, a sub-plane prediction encoder includes a video division unit 410, a sub-plane encoding unit 420, a mode determination unit 422, a transformation unit 430, a quantization unit 440, an entropy encoding unit 450, an inverse quantization unit 460, and an inverse transformation unit 470. The sub-plane encoding unit 420 includes a sub-plane intraprediction unit and a sub-plane interprediction unit that are not shown in FIG. 4.

Hereinafter, an intraprediction encoding method according to an exemplary embodiment of the present invention will be described with reference to FIGS. 5 through 8.

Figure 5A:
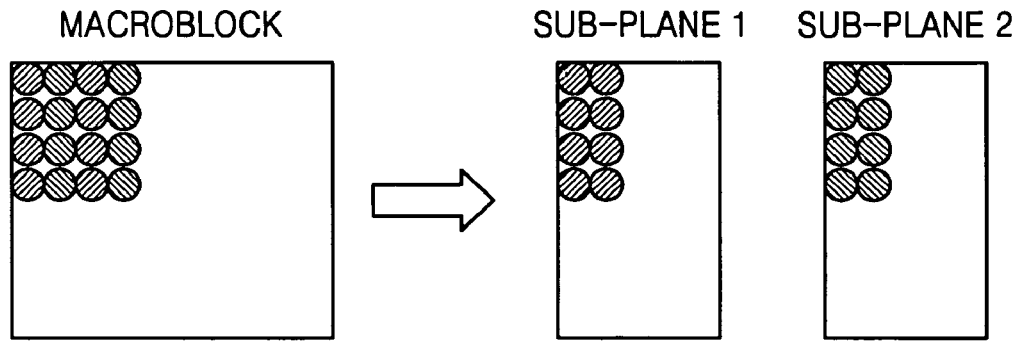
FIGS. 5A through 5C are views for explaining a sub-plane prediction encoding method according to an embodiment of the present invention.
Figure 5B:
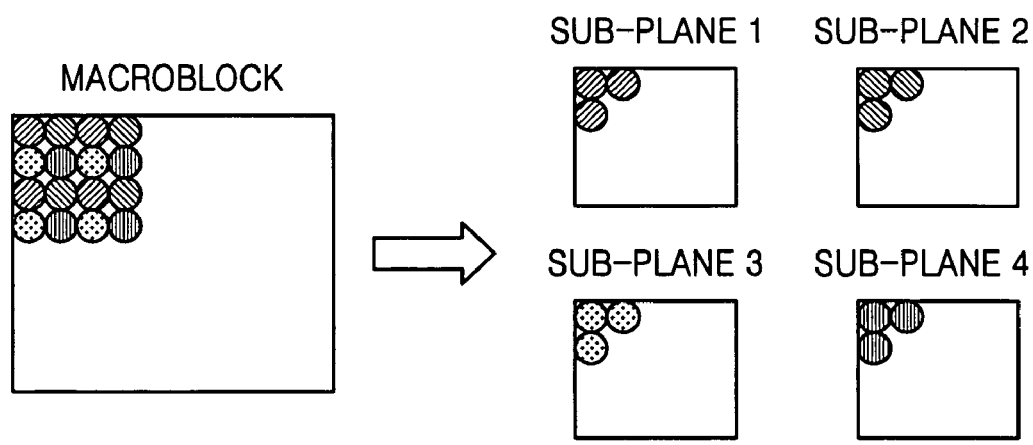
Figure 5C:
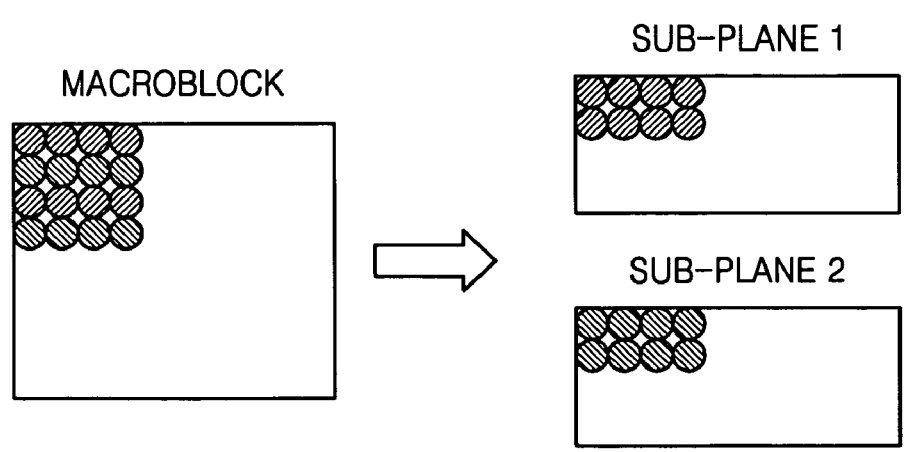

The video division unit 410 sub-samples a block of a predetermined size, e.g., a macroblock, from an input video and divides the macroblock into a predetermined number of sub-planes. For example, a macroblock may be divided into two 8×16 sub-planes as illustrated in FIG. 5A, four 8×8 sub-planes as illustrated in FIG. 5B, or two 16×8 sub-planes as illustrated in FIG. 5C. A macroblock of a predetermined size is sub-sampled and then divided into a plurality of sub-planes in the current exemplary embodiment of the present invention, but the present invention can also be applied to a case where a block of an arbitrary size is sampled.

FIGS. 5A through 5C are views for explaining sub-plane prediction encoding modes according to an exemplary embodiment of the present invention. In FIG. 5A, an intra macroblock is horizontally sub-sampled to obtain two sub-planes. In FIG. 5B, an intra macroblock is sub-sampled to obtain four sub-planes. In FIG. 5C, an intra macroblock is vertically sub-sampled to obtain two sub-planes.

Video division can be made based on the characteristic of an input video or intraprediction encoding efficiency. For example, the number of divided sub-planes and the size of each divided sub-plane may be determined according to the spatial characteristic of an input video. In other words, when the input video has much correlation in both a horizontal direction and a vertical direction, it is divided into four 8×8 sub-planes. When the input video has much correlation only in a horizontal direction, it is horizontally sub-sampled and is divided into 8×16 sub-planes. When the input video has much correlation only in a vertical direction, it is vertically sub-sampled and is divided into 16×8 sub-planes.

The intraprediction unit of the sub-plane encoding unit 420 selects one of the plurality of sub-planes divided by the video division unit 410 and performs intraprediction on the selected sub-plane. The selection of the sub-plane may be made in such a way that a sub-plane at a predetermined position is selected or intraprediction is performed on each of the plurality of sub-planes and then a sub-plane having the smallest cost is selected.

Figure 6A:
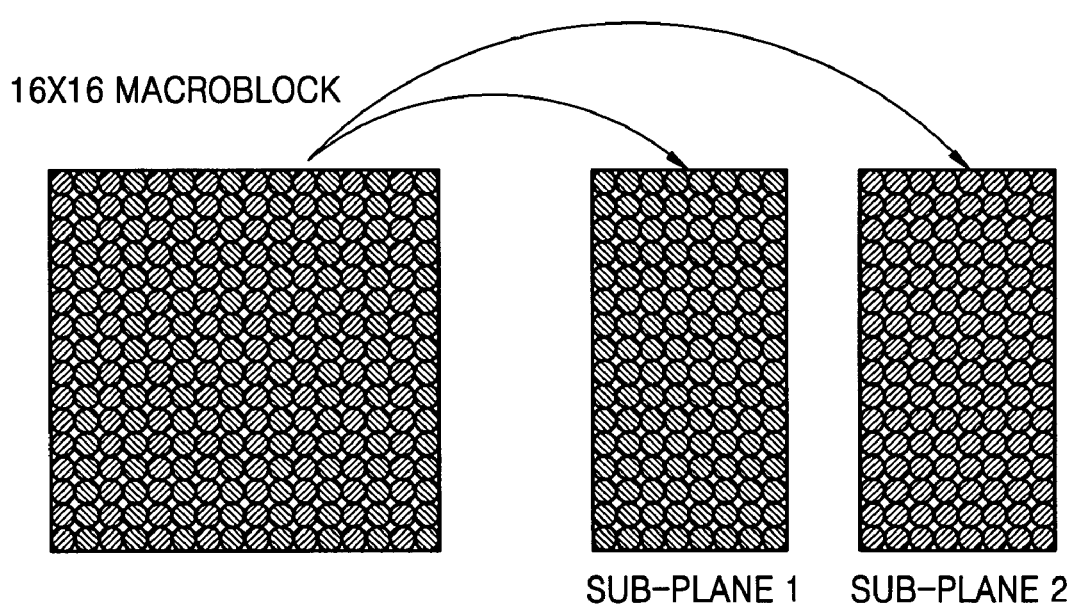
FIGS. 6A and 6B are views for explaining neighboring samples for intraprediction of a 16×8 sub-plane.
Figure 6B:
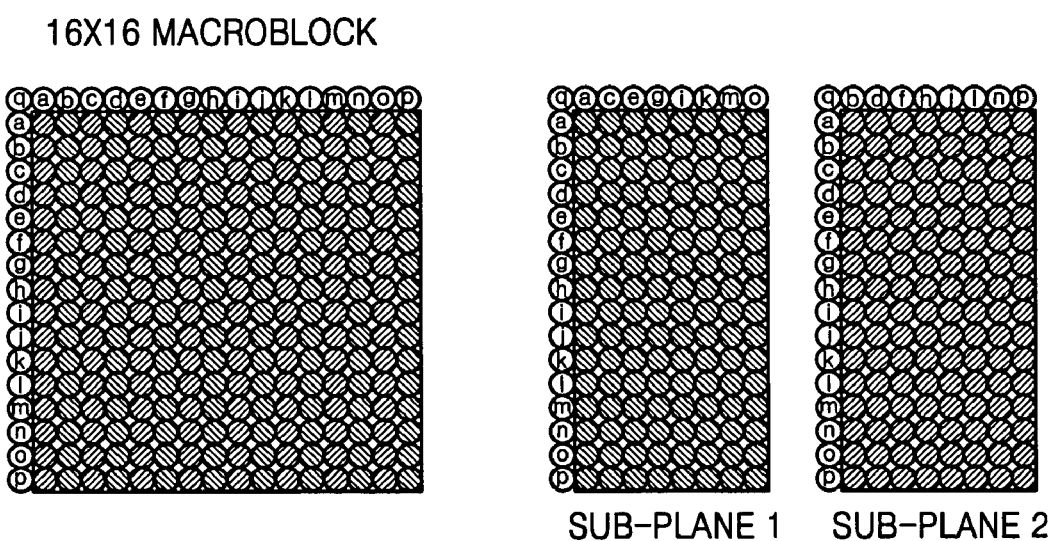

FIGS. 6A and 6B are views for explaining neighboring samples for intraprediction of a 8×16 sub-plane. For example, since a sub-plane 1 is obtained by horizontally sub-sampling a macroblock, intraprediction is performed on the sub-plane 1 using neighboring samples a, c, e, g, i, k, m, and o among neighboring samples a, b, c, d, e, f, g, h, i, j, k, l, m, n, o, and p located above the original macroblock.

At this time, like in conventional 8×16 intraprediction, the optimal prediction mode may be selected after vertical prediction, horizontal prediction, and direct current (DC) prediction are performed.

Figure 7:
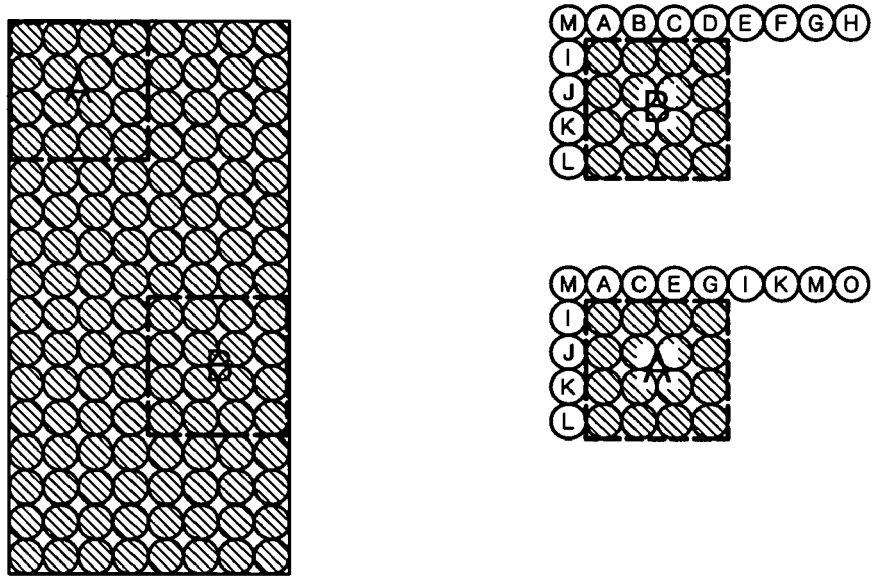
FIG. 7 is a view for explaining the implementation of a 4×4 intraprediction mode on a sub-plane.

FIG. 7 is a view for explaining the implementation of a 4×4 intraprediction mode on a selected sub-plane. As illustrated in FIG. 6B, after neighboring samples for intraprediction are obtained, intraprediction is performed according to a conventional intraprediction method.

Figures 1, 2:
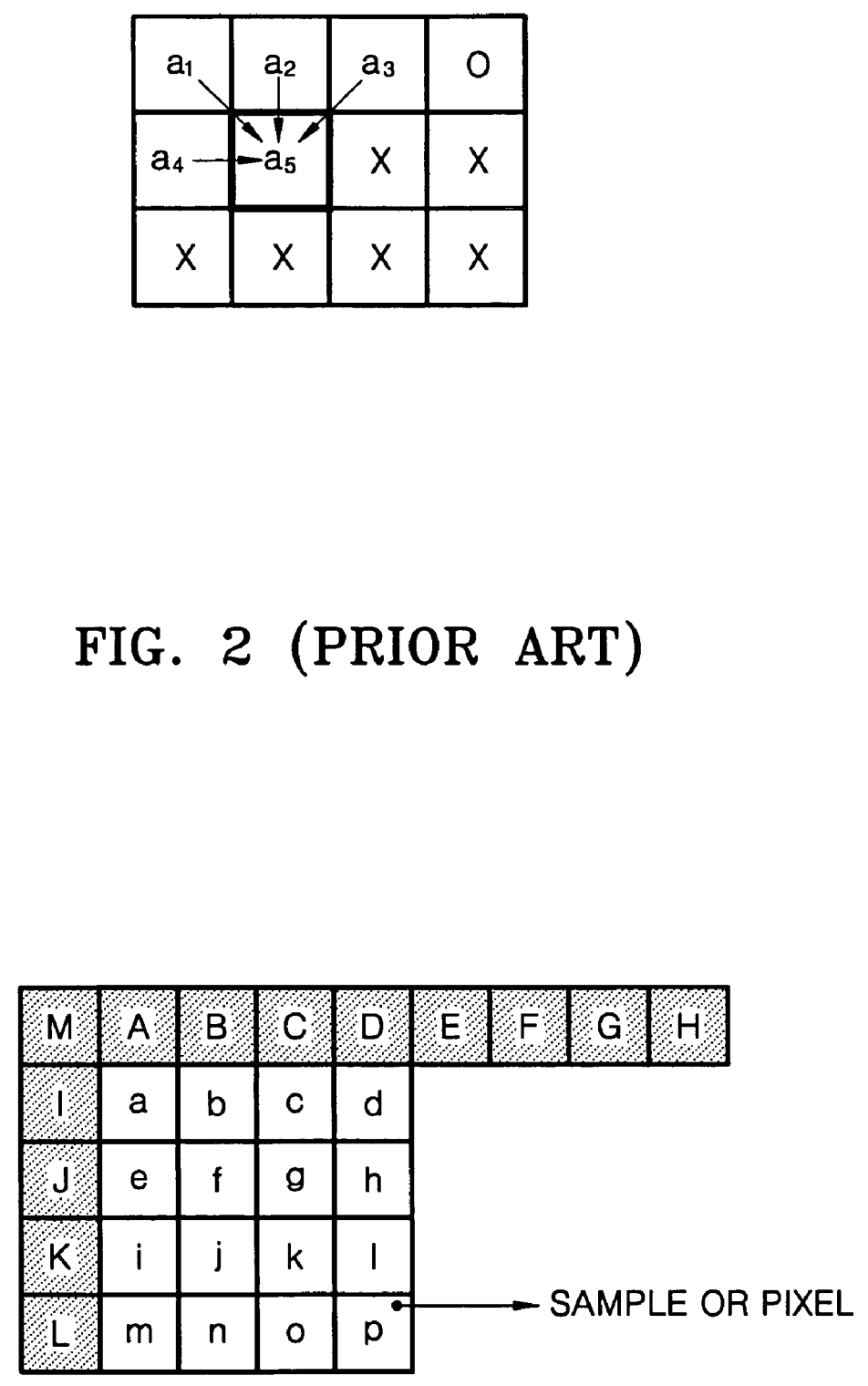
Figure 3:
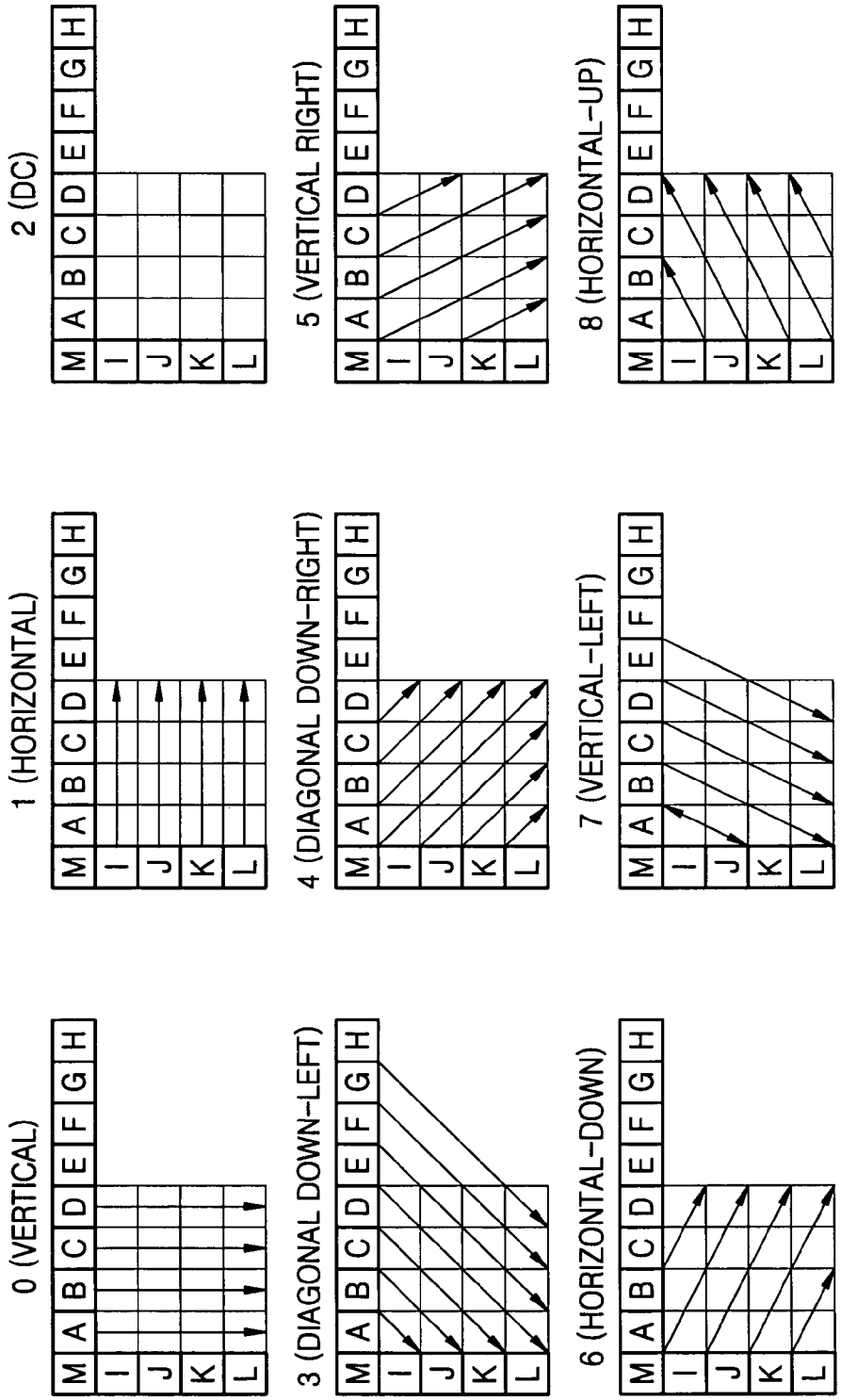
FIG. 3 illustrates intra 4×4 modes used in H.264 according to the prior art.

Neighboring samples for intraprediction of a block located at the boundary of a sub-plane, such as a block A, are the neighboring samples used in FIG. 6B, i.e., a, c, e, g, and i. Neighboring samples for intraprediction of a block located inside a boundary, such as a block B, are samples of a previously decoded 4×4 block like in a conventional 4×4 intraprediction implementation method as illustrated in FIG. 2. After the 9 directional modes of conventional 4×4 intraprediction illustrated in FIG. 3 are all applied, the optimal mode may be selected. At this time, a cost in the selected optimal mode is determined as a cost in a 4×4 intraprediction.

As such, for the sub-plane 1, costs in an 8×16 intraprediction and a 4×4 intraprediction are compared to select the optimal intraprediction and a cost in the selected intraprediction may be determined as a cost of the sub-plane 1.

Similarly, after intraprediction is performed on the other sub-planes, costs of the other sub-planes are determined. Costs of all the sub-planes are compared and a sub-plane having the smallest cost is determined as a sub-plane for intraprediction.

Here, the cost can be calculated using various methods. For example, cost functions such as a sum of absolute difference (SAD) cost function, a sum of absolute transformed difference (SATD) cost function, a sum of squared difference (SSD) cost function, a mean of absolute difference (MAD) cost function, and a Lagrange cost function may be used. The SAD is a sum of absolute values of prediction residues of blocks, e.g., 4×4 blocks. The SATD is a sum of absolute values of coefficients obtained by applying Hadamard transform on prediction residues of 4×4 blocks. The SSD is a sum of squared prediction residues of 4×4 block prediction samples. The MAD is an average of absolute values of prediction residues of 4×4 block prediction samples. The Lagrange cost function is a modified cost function including bitstream length information.

Although intraprediction encoding is performed on one of the plurality of divided sub-planes in the current exemplary embodiment of the present invention, at least one sub-plane, e.g., two sub-planes among four divided sub-planes, may be first intraprediction encoded and the other remaining sub-planes may be interprediction encoded to improve compression efficiency.

Next, the sub-plane interprediction unit of the sub-plane encoding unit 420 performs interprediction on the remaining sub-plane using the intrapredicted sub-plane as a reference sub-plane. For example, when the sub-plane 1 is already intrapredicted, interprediction is performed on the sub-plane 2 using the sub-plane 1 as a reference sub-plane.

Here, the intrapredicted sub-plane used as the reference sub-plane has already intraprediction decoded after intrapredicted. Alternatively, the intrapredicted sub-plane used as the reference sub-plane may be a sub-plane to be intraprediction encoded.

An interprediction method used in the exemplary embodiment of the present invention is similar to a conventional interprediction method except that a reference sub-plane, instead of a reference picture, is used and motion estimation and compensation are performed using a motion vector having a small range. In interprediction according to an exemplary embodiment of the present invention, a position in a reference sub-plane, which is most similar to a current sub-plane, is indicated by a motion vector and a difference between samples of the reference sub-plane at the position and samples of the current sub-plane is encoded.

Interprediction is performed in units of an 8×16 sub-plane in the current exemplary embodiment of the present invention, but interprediction may be performed in units of an 8×8 sub-plane or a 4×4 sub-plane.

The sub-plane encoding unit 420 may further include a motion estimation and compensation unit for interprediction.

Since the sub-planes in the current exemplary embodiment of the present invention are obtained by sub-sampling a macroblock as illustrated in FIGS. 5A and 6A, the sub-planes have high correlation and compression efficiency according to interprediction is improved.

In the current exemplary embodiment of the present invention, intraprediction is performed on a single sub-plane or a sub-plane selected from a plurality of sub-planes and interprediction is performed on the other sub-planes using the selected sub-plane as a reference sub-plane. However, after intraprediction is performed on a single sub-plane or a sub-plane selected from a plurality of sub-planes and interprediction is performed on the other sub-planes, a combination of prediction methods having the smallest cost may be selected. In addition, another combination of prediction methods may be applied to divided sub-planes.

Although a sub-plane to be intraprediction encoded, or an intraprediction encoded and decoded sub-plane is used as a reference sub-plane in interprediction encoding in the current exemplary embodiment of the present invention, interprediction encoding may be performed using not only a sub-plane to be intraprediction encoded but also previously interprediction encoded and decoded sub-planes as reference sub-planes.

The transformation unit 430 and the quantization unit 440 perform transformation and quantization on intrapredicted and interpredicted sub-planes. The transformation unit 430 and the quantization unit 440 function as in a conventional video encoder and a detailed description thereof will not be given. The transformation unit 430 and the quantization unit 440 may not be included in the intraprediction encoder according to an exemplary embodiment of the present invention.

The mode determination unit 422 transmits information about a determined intraprediction mode, i.e., intraprediction mode information, to the entropy encoding unit 450, and the entropy encoding unit 450 inserts the input intraprediction mode information into a header of a bitstream to be encoded. When a block divided by the video division unit 410 is a macroblock, the intraprediction mode information for each macroblock is inserted. The intraprediction mode information includes information about an intraprediction mode in intraprediction encoding of an encoder, e.g., the size of each of divided sub-planes or the number of divided sub-planes, information specifying an intrapredicted sub-plane, and information about an interprediction encoding method, when a selected intraprediction mode is a sub-plane mode.

The inverse quantization 460 and the inverse quantization unit 470 perform inverse quantization and inverse transformation on transformed and quantized data and input the resulting data to the sub-plane encoding unit 420. The data input to the sub-plane encoding unit 420 is used for intraprediction and interprediction of subsequent blocks in the sub-plane encoding unit 420. The inverse quantization 460 and the inverse quantization unit 470 function as in a conventional video encoder and a detailed description thereof will not be given. When the transformation unit 430 and the quantization unit 440 are not included in the intraprediction encoder according to an exemplary embodiment of the present invention, the inverse quantization 460 and the inverse quantization unit 470 may not also be included in the intraprediction encoder.

Figure 8:
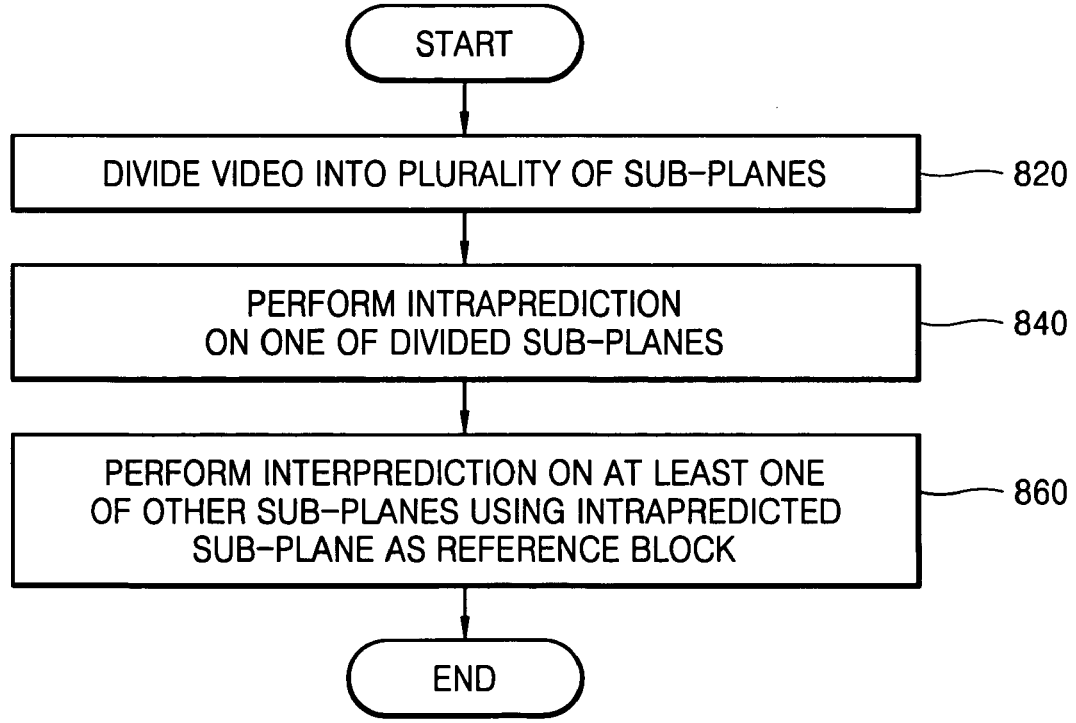
FIG. 8 is a flowchart illustrating sub-plane prediction performed by a sub-plane encoding unit according to an embodiment of the present invention.

FIG. 8 is a flowchart illustrating sub-plane prediction performed by the sub-plane encoding unit 420 according to an exemplary embodiment the present invention.

In operation 820, an input block, e.g., a macroblock is sub-sampled and is divided into a predetermined number of sub-planes. For example, a macroblock is divided into two 8×16 sub-planes as illustrated in FIG. 5A, into four 8×8 sub-planes as illustrated in FIG. 5B, or into two 16×8 sub-planes as illustrated in FIG. 5C.

In operation 840, intraprediction is performed on at least one of the divided sub-planes. At this time, the selection of the sub-plane may be made in such a way that a sub-plane at a predetermined position is selected, or intraprediction is performed on each of the divided sub-planes and a sub-plane having the smallest cost is selected.

In operation 860, interprediction is performed using the sub-plane intrapredicted in operation 840 as a reference sub-plane. Interprediction may be performed in units of a 16×8 sub-plane or an 8×8 or 4×4 sub-plane.

Although interprediction encoding is performed using a sub-plane to be intraprediction encoded or an intraprediction encoded and decoded sub-plane as a reference sub-plane in the current exemplary embodiment of the present invention, interprediction encoding may be performed using not only a sub-plane to be intraprediction encoded or an intraprediction encoded and decoded sub-plane but also previously interprediction encoded and decoded sub-planes as reference sub-planes.

In addition, mode information about the division into the sub-plane and intraprediction and interprediction performed in operations 820 through 860 may be generated, and the generated mode information may be inserted into a bitstream in entropy encoding.

Transformation and quantization may be performed on the intrapredicted sub-plane and the interpredicted sub-plane.

Figure 9:
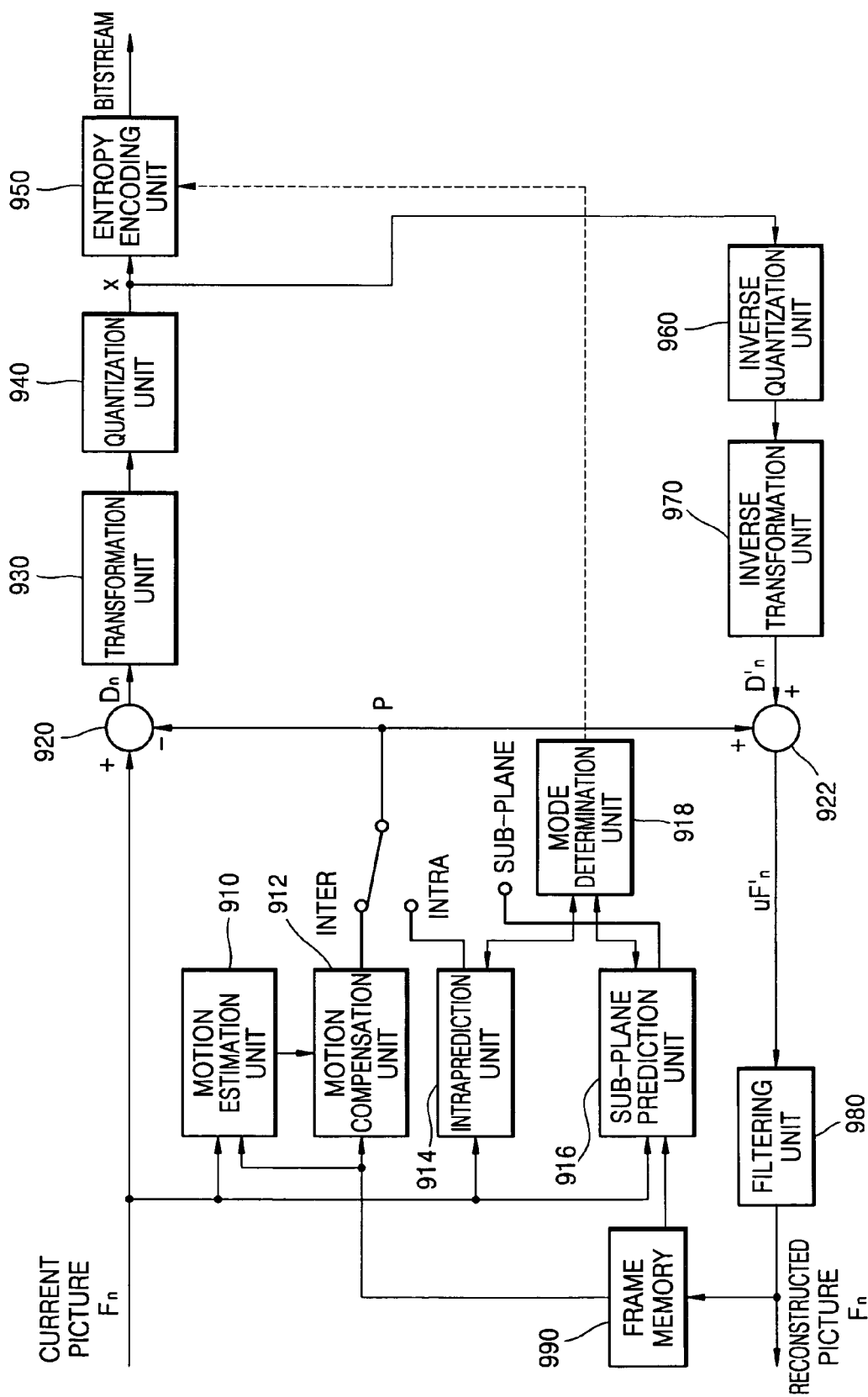
FIG. 9 is a block diagram of a video encoder using a sub-plane prediction encoding method according to an embodiment of the present invention.

FIG. 9 is a block diagram of a video encoder using a sub-plane prediction encoding method according to an exemplary embodiment of the present invention.

Referring to FIG. 9, a video encoder 900 according to an exemplary embodiment of the present invention includes a motion estimation unit 910, a motion compensation unit 912, an intraprediction unit 914, a sub-plane prediction unit 916, a mode determination unit 918, a subtraction unit 920, an adding unit 922, a transformation unit 930, a quantization unit 940, an entropy encoding unit 950, an inverse quantization unit 960, an inverse transformation unit 970, a filtering unit 980, and a frame memory 990.

Here, the other functional units, except for the sub-plane prediction unit 916, the mode determination unit 918, and the entropy encoding unit 950, function as in a conventional video encoder, e.g., a H.264 encoder, and a detailed description thereof will not be given.

The sub-plane prediction unit 916 corresponds to the video division unit 410 and the sub-plane encoding unit 420 of FIG. 4 and the entropy encoding unit 950 corresponds to the entropy encoding unit 450 of FIG. 4.

The mode determination unit 918 compares costs in conventional intraprediction modes implemented by the intraprediction unit 914, e.g., a cost in a 16×16 prediction mode, a cost in an 8×8 prediction mode, a cost in a 4×4 prediction mode, and a cost in a sub-plane prediction mode of the sub-plane prediction unit 916 to select one prediction mode, generates mode information about the selected prediction mode, and transmits the mode information to the entropy encoding unit 950.

Figure 10:
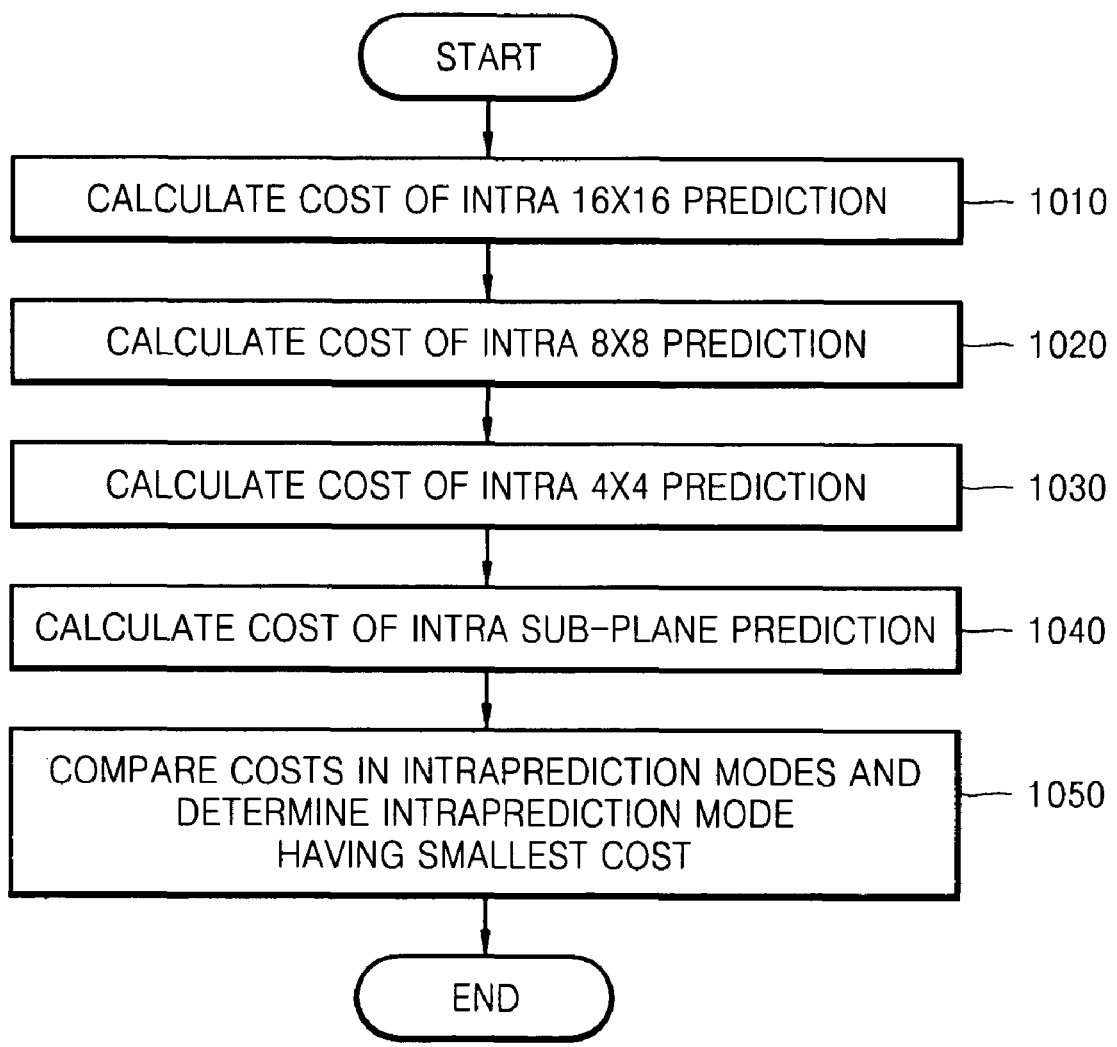
FIG. 10 is a flowchart illustrating intraprediction mode determination performed by a mode determination unit according to an embodiment of the present invention.

FIG. 10 is a flowchart illustrating intraprediction mode determination performed by the mode determination unit 918 according to an exemplary embodiment of the present invention.

In operations 1010 through 1030, a cost in a 16×16 prediction mode, a cost in an 8×8 prediction mode, and a cost in 4×4 prediction mode are calculated.

In operation 1040, a cost in a sub-plane prediction mode is calculated.

In operation 1050, the costs calculated in operations 1010 through 1040 are compared and an intraprediction mode having the smallest cost is determined.

When the sub-plane prediction mode is selected, a generated intraprediction value is transmitted to the transformation unit 930.

Although not shown in figures, the entropy encoding unit 950 may use a scan method adaptively selected for each predetermined block.

Figure 11A:
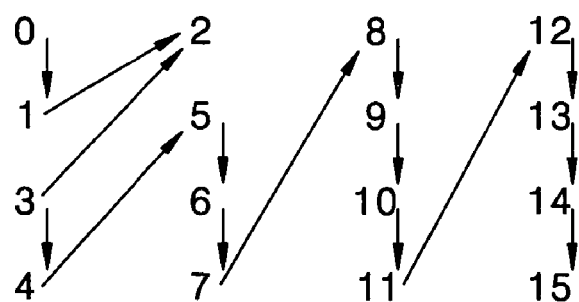
FIGS. 11A and 11B illustrate examples of a scan method used in the present invention.
Figure 11B:
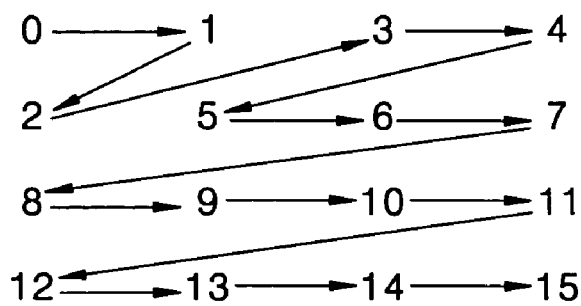

FIGS. 11A and 11B illustrate examples of a scan method used in an exemplary embodiment of the present invention.

FIG. 11A illustrates a vertical sampling scan method and FIG. 11B illustrates a horizontal sampling scan method. In an exemplary embodiment of the present invention, an input video is divided into sub-planes of a predetermined type based on the characteristic of the input video and a predetermined scan method is selected to scan video data obtained by performing intraprediction on the divided sub-planes. In other words, a scan method is used adaptively according to the type of sub-planes divided from the input video. When each macroblock of the input video is divided into sub-planes, information about a selected scan method may be inserted into each macroblock.

Figure 12:
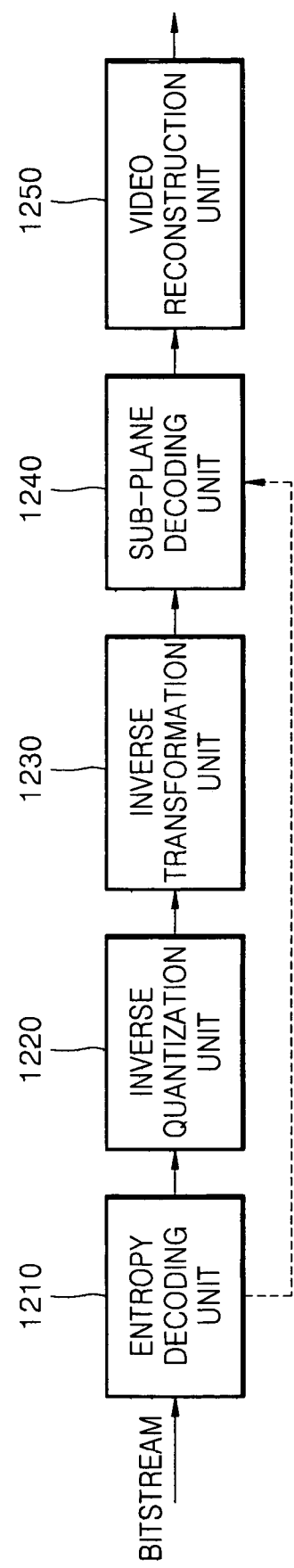
FIG. 12 is a block diagram of a sub-plane prediction decoder according to an embodiment of the present invention.

FIG. 12 is a block diagram of a sub-plane prediction decoder according to an exemplary embodiment of the present invention.

Referring to FIG. 12, the sub-plane prediction decoder includes an entropy decoding unit 1210, an inverse quantization unit 1220, an inverse transformation unit 1230, a sub-plane decoding unit 1240, and a video reconstruction unit 1250. The inverse quantization unit 1220 and the inverse transformation unit 1230 function as in a conventional video decoder, e.g., a H.264 video decoder, and a detailed description thereof will not be given. The sub-plane decoding unit 1240 includes a sub-plane intraprediction unit and a sub-plane interprediction unit that are not shown in FIG. 12.

The entropy decoding unit 1210 receives an encoded bitstream, performs entropy decoding on the received bitstream to extract video data, and simultaneously transmits the extracted video data to the inverse quantization unit 1220 and mode information extracted from the bitstream to the sub-plane decoding unit 1240. The mode information includes information about an intraprediction mode used in intraprediction encoding of an encoder, e.g., the size of each of divided sub-planes or the number of divided sub-planes, information specifying an intrapredicted sub-plane, and information about an interprediction encoding method, when a selected intraprediction mode is a sub-plane mode.

Here, the received bitstream includes video data obtained by performing intraprediction on at least one of sub-planes divided from an input video of a predetermined size and performing interprediction encoding on at least one of the other sub-planes based on the intrapredicted sub-plane.

The inverse quantization unit 1220 and the inverse transformation unit 1230 perform inverse quantization and inverse transformation on the extracted video data. When the extracted video data are not quantized and transformed, the inverse quantization unit 1220 and the inverse transformation unit 1230 may not be included in the sub-plane prediction decoder.

The sub-plane decoding unit 1240 performs sub-plane prediction decoding on the inversely transformed video data based on the input mode information, according to an exemplary embodiment of the present invention.

For example, when the mode information indicates that a macroblock was divided into two 16×8 sub-planes, intraprediction was performed on a 16×8 sub-plane 1, and interprediction was performed on a 16×8 sub-plane 2 using the sub-plane 1 as a reference sub-plane, intraprediction decoding is performed on a current macroblock as follows.

The mode information includes all information for intraprediction decoding in the current exemplary embodiment of the present invention, but a prediction mode table including information about all prediction modes is shared in an encoder and a decoder and only an index specifying the prediction mode table may be transmitted.

Figure 13:
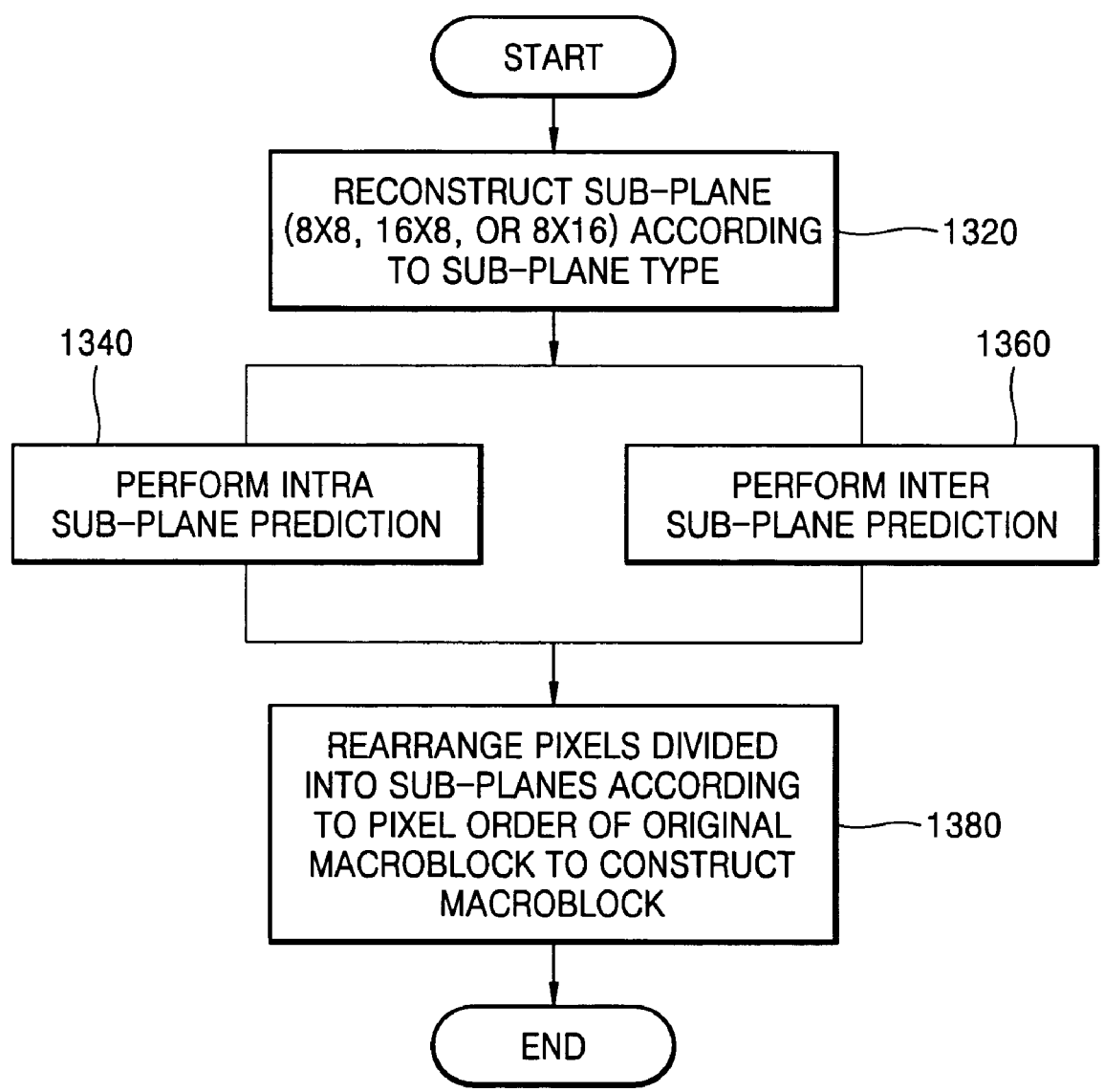
FIG. 13 is a flowchart illustrating sub-plane prediction decoding performed by a sub-plane encoding unit and a video reconstruction unit of FIG. 12.

FIG. 13 is a flowchart illustrating sub-plane prediction decoding performed by the sub-plane decoding unit 1240 and the video reconstruction unit 1250 of FIG. 12.

In operation 1320, for decoding in a sub-plane prediction mode, a sub-plane, e.g., one of an 8×8 sub-plane, an 8×16 sub-plane, and a 16×8 sub-plane is reconstructed according to a sub-plane type. In the current exemplary embodiment of the present invention, the sub-plane type is an 8×16 sub-plane.

Next, in operation 1340, decoding is performed on the intraprediction encoded sub-plane 1. For example, neighboring sub-planes used for intraprediction encoding are constructed to generate a prediction sample, and an input residue and a prediction value obtained from the prediction sample are added, thereby reconstructing the sub-plane 1.

Figure 14:
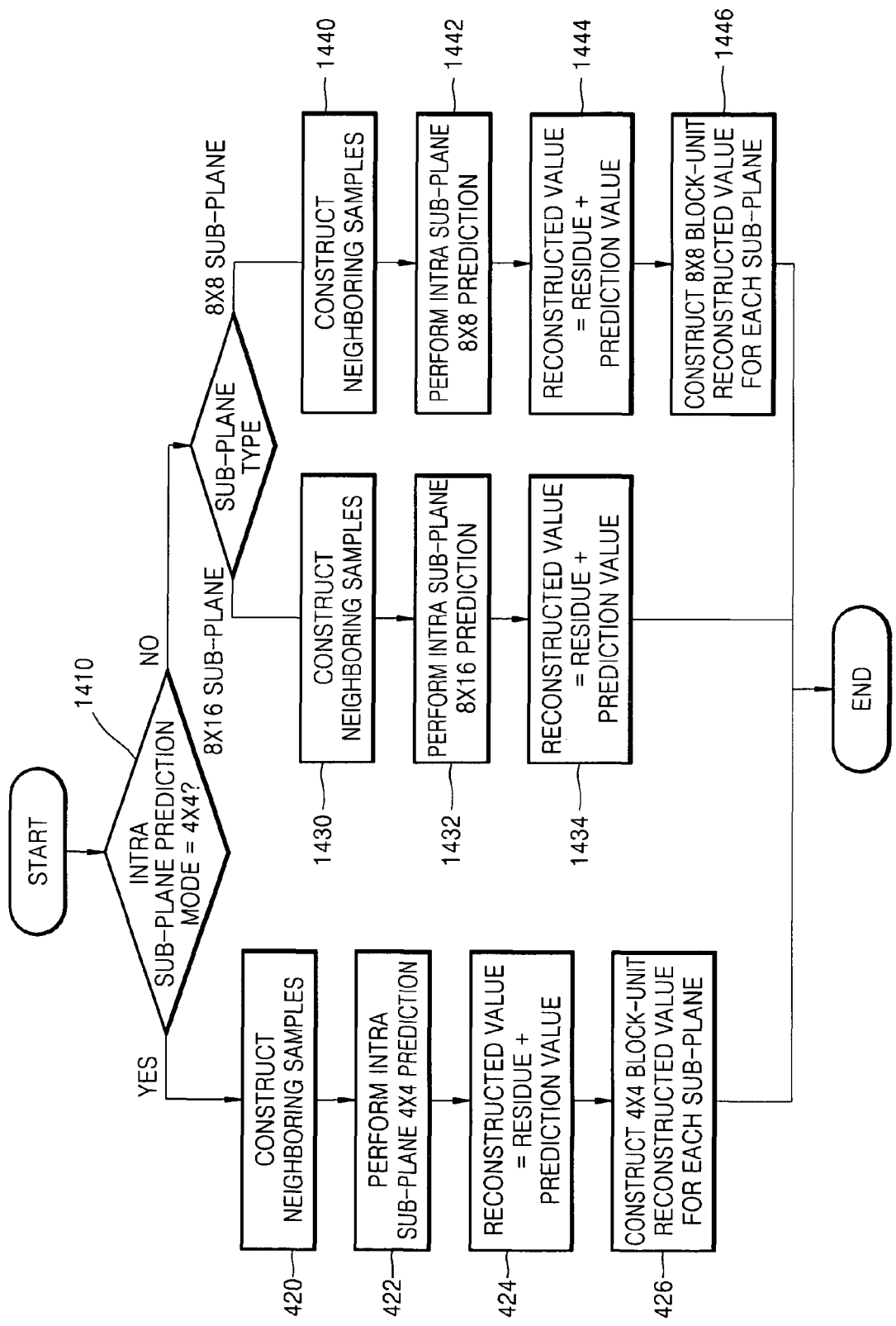
FIG. 14 is a flowchart illustrating intraprediction decoding in a sub-plane mode according to an embodiment of the present invention.

FIG. 14 is a flowchart illustrating intraprediction decoding in the sub-plane mode according to an exemplary embodiment of the present invention. In operations 1420 through 1426, intraprediction decoding is performed when intraprediction is performed in units of a 4×4 block. In operations 1430 through 1434, intraprediction decoding is performed when intraprediction is performed in units of a 8×16 block. In operations 1440 through 1446, intraprediction decoding is performed when intraprediction is performed in units of an 8×8 block.

As illustrated in FIG. 14, when intraprediction is performed in units of a 4×4 block and an 8×8 block, a process of sequentially arranging a reconstructed 4×4 block and a reconstructed 8×8 block and reconstructing an 8×16 sub-plane is additionally required.

When decoding of the sub-plane 1 is completed, interprediction decoding is performed using the already decoded sub-plane 1 as a reference sub-plane in operation 1360. For example, when interprediction encoding is performed in units of an 8×16 sub-plane, motion compensation is performed on the reference sub-plane using a motion vector to obtain a prediction sub-plane and an input residue and a prediction value obtained from the prediction sub-plane are added to obtain a reconstruction value, thereby reconstructing a sub-plane 2. Interprediction decoding is performed in units of an 8×16 sub-plane in the current exemplary embodiment of the present invention, but interprediction decoding may be performed in units of a 4×4 sub-plane.

Figure 15:
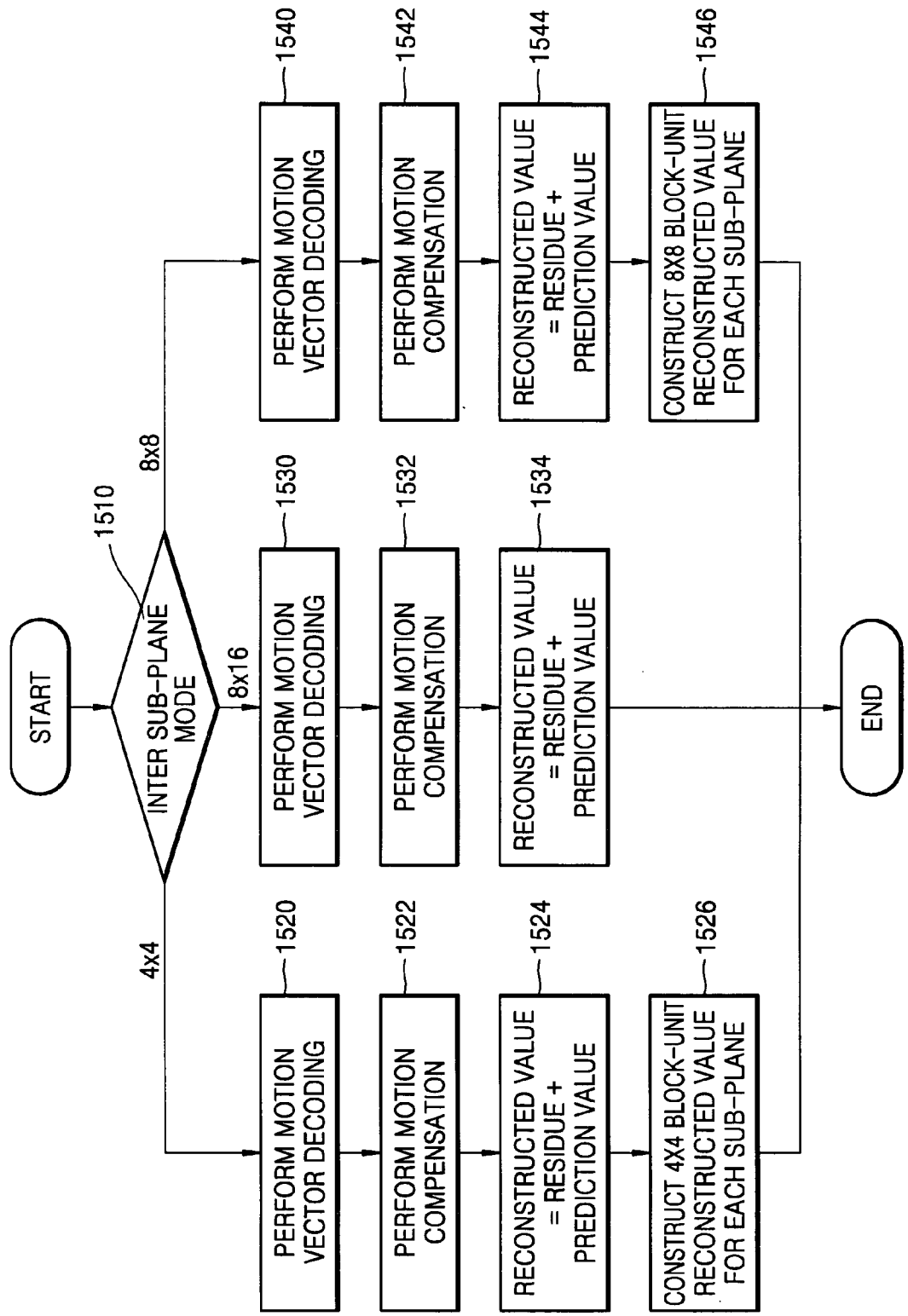
FIG. 15 is a flowchart illustrating interprediction decoding in a sub-plane mode according to an embodiment of the present invention.

FIG. 15 is a flowchart illustrating interprediction decoding according to an exemplary embodiment of the present invention. In operations 1520 through 1526, interprediction decoding is performed when interprediction is performed in units of a 4×4 block. In operations 1530 through 1534, interprediction decoding is performed when interprediction is performed in units of an 8×16 block. In operations 1540 through 1546, interprediction decoding is performed when interprediction is performed in units of an 8×8 block.

Here, when interprediction is performed in units of a 4×4 block and an 8×8 block, a process of sequentially arranging a reconstructed 4×4 block and a reconstructed 8×8 block and reconstructing an 8×16 sub-plane is additionally required.

The video reconstruction unit 1250 in FIG. 12 reconstructs the original video block from the sub-planes obtained by the sub-plane decoding unit 1240 (see operation 1380 of FIG. 13). In the current exemplary embodiment, an intraprediction decoded sub-plane 1 and an interprediction decoded sub-plane 2 are reconstructed into a single macroblock. In other words, when the original video block is a macroblock, pixels divided into sub-planes are rearranged according to a pixel order of the original macroblock, thereby constructing the macroblock.

Figure 16:
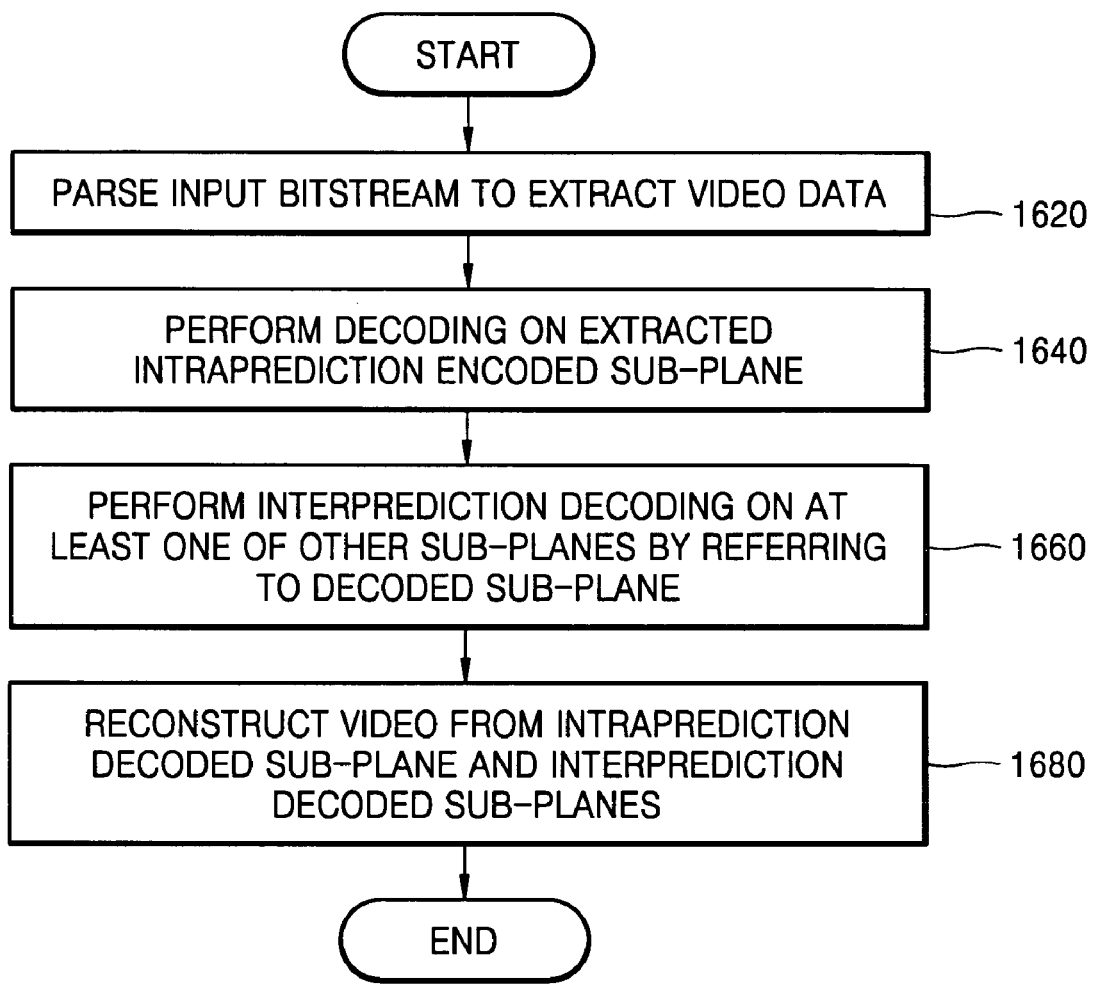
FIG. 16 is a flowchart illustrating a sub-plane prediction decoding method according to an embodiment of the present invention.

FIG. 16 is a flowchart illustrating a sub-plane prediction decoding method according to an exemplary embodiment of the present invention.

Referring to FIG. 16, in operation 1620, a header of a macroblock included into an input bitstream is parsed to extract video data. When mode information about a sub-plane type, intraprediction, and interprediction used in an encoder are included in the input bitstream, the video data and the mode information are extracted. Hereinafter, to simplify explanation, it is assumed that intraprediction decoding is performed on a current macroblock to be decoded, in particular, in a sub-plane mode.

Here, the input bitstream includes video data obtained by performing intraprediction on at least one of sub-planes divided from an input video of a predetermined size and performing interprediction encoding on at least one of the other sub-planes based on the intrapredicted sub-plane.

In operation 1640, decoding is performed on an intraprediction encoded sub-plane among the divided sub-planes. Decoding may be performed on an intraprediction encoded sub-plane based on the extracted mode information. When intraprediction decoding is performed in smaller units than the divided sub-plane, a process of reconstructing a sub-plane may also be additionally required after intraprediction decoding.

In operation 1660, interprediction decoding is performed on the other sub-planes with reference to the decoded sub-plane. The intraprediction encoded sub-plane may be decoded based on the extracted mode information. When interprediction decoding is performed in smaller units than the divided sub-plane, a process of reconstructing a sub-plane may also be additionally required after intraprediction decoding.

Interprediction decoding is performed on the other sub-planes using the intraprediction decoded sub-plane as a reference sub-plane in the current exemplary embodiment of the present invention, but interprediction decoding may be performed based on previously interprediction decoded sub-planes.

In operation 1680, a video, e.g., a macroblock is reconstructed from the intraprediction decoded sub-plane and the interprediction decoded sub-plane.

Operation 1620 may further include a process of performing inverse quantization and inverse transformation on extracted video data when the extracted video data was transformed and quantized.

Figure 17:
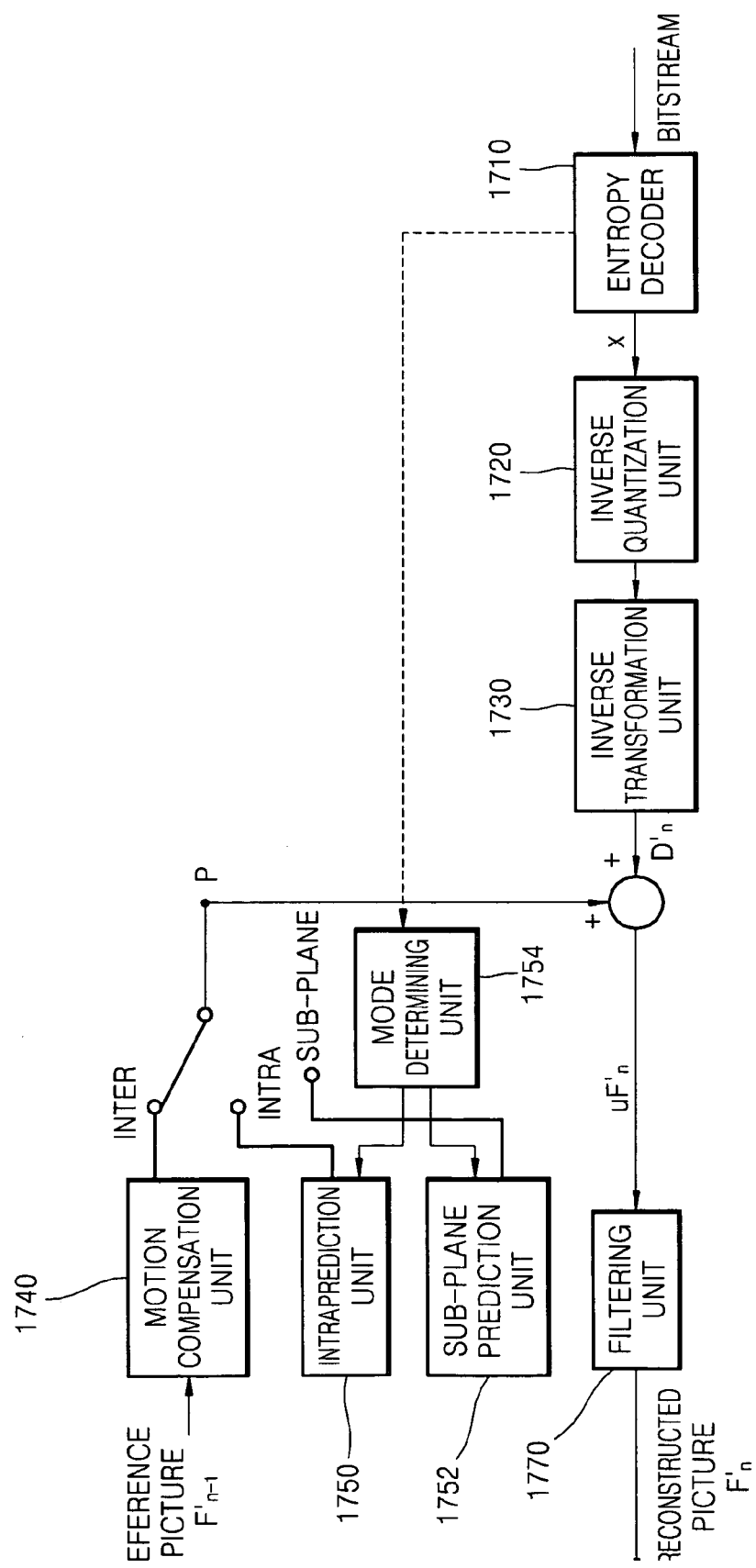
FIG. 17 is a block diagram of a video decoder using a sub-plane prediction decoding method according to an embodiment of the present invention.

FIG. 17 is a block diagram of a video decoder using a sub-plane prediction decoding method according to an exemplary embodiment of the present invention.

Referring to FIG. 17, the video decoder includes an entropy decoder 1710, an inverse quantization unit 1720, an inverse transformation unit 1730, a motion compensation unit 1740, an intraprediction unit 1750, a sub-plane prediction unit 1752, a mode determination unit 1754, and a filtering unit 1770.

The other functional units except for the entropy decoder 1710, the sub-plane prediction unit 1752, and the mode determination unit 1754 function in the same way as those in a conventional video decoder, e.g., a H.264 video decoder, and a detailed description thereof will not be given.

The entropy decoder 1710 receives a compressed bitstream and performs entropy decoding on the received bitstream to extract video data and intraprediction mode information.

The inverse quantization unit 1720 and the inverse transformation unit 1730 perform inverse quantization and inverse transformation on the extracted video data.

The motion compensation unit 1740 generates a prediction block according to an encoded picture type, and the prediction block and a residue $D'_n$ are added to generate $uF'_n$. $uF'_n$ passes through the filtering unit 1770 to generate a reconstructed picture $F'_n$.

When the intraprediction mode information extracted by the entropy decoder 1710 indicates an intra 4×4 mode, an intra 8×8 mode, and an intra 16×16 mode, the intraprediction unit 1750 performs intra 4×4 mode decoding, intra 8×8 mode decoding, and intra 16×16 mode decoding on the input video data in the same way as performed in a conventional video decoder.

When the extracted intraprediction mode information indicates an intra sub-plane mode, the sub-plane prediction unit 1752 performs intraprediction and video reconstruction on the inversely transformed video data as in the sub-plane decoding unit 1240 and the video reconstruction unit 1250 of FIG. 12. Thus, a detailed description will not be given.

The mode determination unit 1754 determines which one of the intraprediction unit 1750 and the sub-plane prediction unit 1752 is to process the input video data according to the intraprediction mode information extracted by the entropy decoder 1710.

Figure 18:
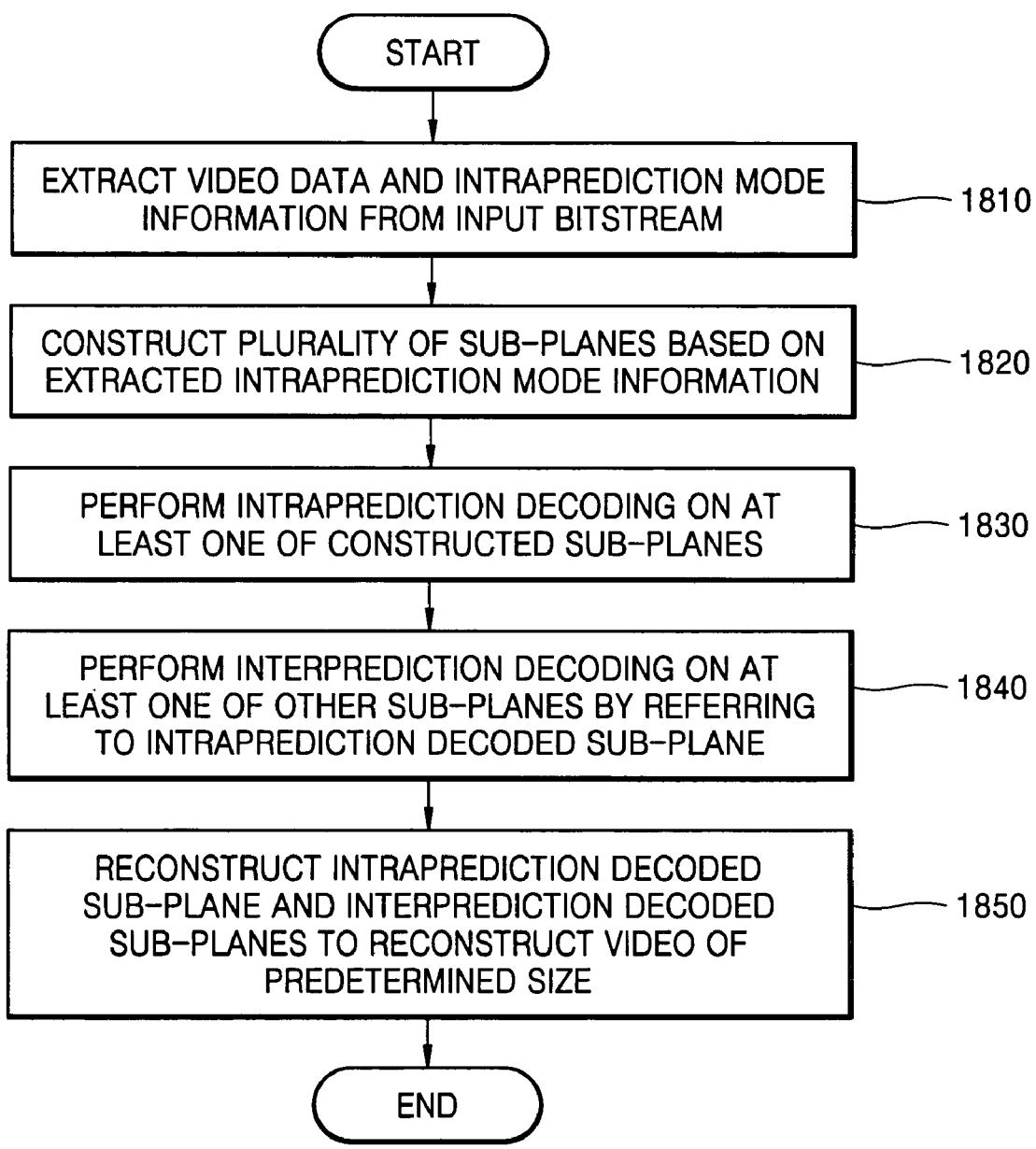
FIG. 18 is a flowchart illustrating a video decoding method using a sub-plane prediction decoding method according to an embodiment of the present invention.

FIG. 18 is a flowchart illustrating a video decoding method using a sub-plane prediction decoding method according to an exemplary embodiment of the present invention.

Referring to FIG. 18, in operation 1810, a compressed bitstream is received and is entropy-decoded to extract video data and intraprediction mode information. A process of performing inverse quantization and inverse transformation on the extracted video data may be further included.

In operation 1820, a plurality of sub-planes is constructed based on the extracted intraprediction mode information. When the extracted intraprediction mode information indicates an intra 4×4 mode, an intra 8×8 mode, and an intra 16×16 mode, intra 4×4 mode decoding, intra 8×8 mode decoding, and intra 16×16 mode decoding are performed on the input video data in the same way as performed in a conventional video decoder. When the intraprediction mode information indicates a sub-plane mode, intraprediction decoding and interprediction decoding illustrated in FIGS. 13 through 15 are performed on the inversely transformed video data. In the current exemplary embodiment, the extracted intraprediction mode is assumed to be the sub-plane mode.

In operation 1830, intraprediction decoding is performed on at least one of a plurality of constructed sub-planes.

In operation 1840, interprediction decoding is performed on the other sub-planes with reference to the intraprediction decoded sub-plane.

In operation 1850, the intraprediction decoded sub-plane and the interprediction decoded sub-planes are reconstructed to reconstruct a video of a predetermined size.

As described above, according to the present invention, a single macroblock is sub-sampled and divided into a plurality of sub-planes and intraprediction encoding and interprediction encoding are adaptively performed on the divided sub-planes, thereby improving the compression rate of video data.

Meanwhile, the present invention can also be embodied as a computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (e.g., transmission over the Internet). The computer-readable recording medium can also be distributed over network coupled computer systems so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A video decoding method comprising:
    receiving an encoded bitstream comprising video data obtained by performing intraprediction encoding on at least one of at least two sub-planes divided from an input video of a predetermined size and then performing interprediction encoding on at least one remaining sub-plane of the at least two sub-planes based on the intraprediction encoded at least one sub-plane;
    extracting video data from the received encoded bitstream;
    performing intraprediction decoding on the intraprediction encoded at least one sub-plane included in the extracted video data; and
    performing interprediction decoding on the interprediction encoded at least one remaining sub-plane by referring to the intraprediction decoded at least one sub-plane.

2. The video decoding method of claim 1, further comprising reconstructing the intraprediction decoded at least one sub-plane and the interprediction decoded at least one sub-plane to reconstruct the input video.

3. The video decoding method of claim 1, wherein the encoded bitstream comprises mode information comprising at least one of a size of each of the at least two sub-planes, a number of the at least two sub-planes, information specifying the first intraprediction encoded at least one sub-plane, and information about a method of the interprediction encoding.

4. The video decoding method of claim 3, further comprising extracting the mode information, wherein the intraprediction decoding and the interprediction decoding are performed based on the extracted mode information.

5. The video decoding method of claim 1, further comprising constructing the at least two sub-planes from the extracted video data.

6. The video decoding method of claim 1, wherein the at least two sub-planes are obtained by sub-sampling the input video of the predetermined size.

7. The video decoding method of 6, wherein the at least two sub-planes are obtained by dividing the input video into the at least two sub-planes according to a spatial characteristic of the input video.

8. The video decoding method of claim 1, wherein the input video of the predetermined size is a macroblock.

9. The video decoding method of claim 1, further comprising performing entropy decoding on the received encoded bitstream, wherein the entropy decoding uses a scan method among a plurality of scan methods, determined according to a method of dividing the input video into the at least two sub-planes.

10. The video decoding method of claim 1, wherein the at least one reference sub-plane is at least one sub-plane second intraprediction encoded and decoded, or at least one sub-plane to be third intraprediction encoded.

11. A non-transitory computer-readable recording medium having a stored computer program which executes the video decoding method of claim 1.

12. A video decoder comprising:
    an entropy decoding unit which receives an encoded bitstream comprising video data obtained by performing intraprediction encoding on at least one of at least two sub-planes divided from an input video of a predetermined size and then performing interprediction encoding on at least one remaining sub-plane of the at least two sub-planes referring to the intraprediction encoded at least one sub-plane, and extracts video data from the received encoded bitstream;
    a sub-plane intraprediction decoding unit which performs intraprediction decoding on the intraprediction encoded at least one sub-plane included in the extracted video data; and
    a sub-plane interprediction decoding unit which performs interprediction decoding on the interprediction encoded at least one sub-plane by referring to the intraprediction decoded at least one sub-plane.

13. The video decoder of claim 12, further comprising a video reconstruction unit which reconstructs the intraprediction decoded at least one sub-plane and the interprediction decoded at least one sub-plane to reconstruct the input video.

14. The video decoder of claim 12, wherein the encoded bitstream comprises mode information comprising at least one of a size of each of the at least two sub-planes, a number of the at least two sub-planes, information specifying the intraprediction encoded at least one sub-plane, and information about a method of the interprediction encoding.

15. The video decoder of claim 12, wherein the at least two sub-planes are obtained by sub-sampling the input video of the predetermined size.

16. The video decoder of claim 12, wherein the at least two sub-planes are obtained by dividing the input video into the at least two sub-planes according to a spatial characteristic of the input video.

17. The video decoder of claim 12, wherein the entropy decoding unit selects a scan method from a plurality of scan methods according to a method of dividing the input video into the at least two sub-planes.

18. The video decoder of claim 12, further comprising:
    a mode determination unit which determines an intraprediction mode which is one of a sub-plane mode and a predetermined block mode; and
    an intraprediction unit which performs second intraprediction decoding on intraprediction encoded at least one predetermined block,
    wherein, in the sub-plane mode, the video data comprises at least one intraprediction encoded predetermined sub-plane, and, in the predetermined block mode, the video data comprises the at least one intraprediction encoded predetermined block, and
    wherein a size of the intraprediction encoded at least one predetermined block is different from a size of the intraprediction encoded at least one predetermined sub-plane.

* * * * *